(12) United States Patent
Flamini et al.

(10) Patent No.: US 9,769,152 B2
(45) Date of Patent: Sep. 19, 2017

(54) ATTRIBUTE-BASED ACCESS CONTROL

(71) Applicant: International Business Machines Corporation, Armonk, NY (US)

(72) Inventors: Elisabetta Flamini, Romsey (GB); Colin R. Penfold, Hants (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 58 days.

(21) Appl. No.: 14/618,824

(22) Filed: Feb. 10, 2015

(65) Prior Publication Data

US 2015/0237041 A1    Aug. 20, 2015

(30) Foreign Application Priority Data

Feb. 20, 2014    (GB) .................................. 1402992.0

(51) Int. Cl.
*H04L 29/06*    (2006.01)
(52) U.S. Cl.
CPC ...... *H04L 63/0823* (2013.01); *H04L 63/0807* (2013.01); *H04L 63/0815* (2013.01)
(58) Field of Classification Search
None
See application file for complete search history.

(56) References Cited

U.S. PATENT DOCUMENTS

| | | | | |
|---|---|---|---|---|
| 8,554,681 B1 * | 10/2013 | Wieder | .................. | G06F 21/10 |
| | | | | 705/51 |
| 9,098,675 B1 * | 8/2015 | Roth | ....................... | G06F 21/00 |
| 2004/0128546 A1 | 7/2004 | Blakley, III et al. | | |
| 2004/0210771 A1 | 10/2004 | Wood et al. | | |
| 2005/0015600 A1 * | 1/2005 | Miyazaki | ................ | G06F 21/64 |
| | | | | 713/176 |
| 2006/0020508 A1 * | 1/2006 | Gorti | ...................... | G06Q 30/02 |
| | | | | 705/14.23 |
| 2008/0046715 A1 | 2/2008 | Balazs et al. | | |

(Continued)

OTHER PUBLICATIONS

Intellectual Property Office—United Kingdom, Search Report for GB Application No. GB1402992.0, Jul. 15, 2014, pp. 1-3, Newport, South Wales, UK.

*Primary Examiner* — Benjamin Lanier
(74) *Attorney, Agent, or Firm* — Lee Law, PLLC; Christopher B. Lee

(57) ABSTRACT

Attribute-based access control is performed across a first and a second security domain in a federated distributed processing environment. A security token received in the second security domain from a first service provider in the first security domain includes access control attributes. Access control information associated with a request to process an online transaction in the second security domain is received from an identity provider in the second security domain. The access control information is mapped into access control attributes compatible with a format of the access control attributes of the received security token. The mapped access control attributes are appended to the received security token to create a modified security token. The modified security token is signed with a certificate of a second service provider in the second security domain, and the modified security token is issued for consuming by any service provider in the second security domain.

24 Claims, 10 Drawing Sheets

(56) References Cited

U.S. PATENT DOCUMENTS

| | | | |
|---|---|---|---|
| 2009/0150981 A1* | 6/2009 | Amies | H04L 67/02 726/5 |
| 2009/0158425 A1* | 6/2009 | Chan | G06F 21/60 726/21 |
| 2011/0131643 A1 | 6/2011 | Lawrence et al. | |
| 2011/0154465 A1* | 6/2011 | Kuzin | H04L 63/0815 726/9 |
| 2013/0007868 A1* | 1/2013 | Hoggan | H04L 9/3263 726/8 |

* cited by examiner

ATTRIBUTE-BASED ACCESS CONTROL

BACKGROUND

The present invention relates to the field of access control. In particular, the present invention relates to a method for attribute-based access control across security domains.

Online transaction processing is a term used to describe a class of data processing systems that facilitate and manage transaction orientated applications. These transaction orientated applications provide the processing logic for enabling processing of user initiated business transactions. For example, user initiated business transactions include booking and paying for a hotel, or booking a flight and purchasing items online, etc.

BRIEF SUMMARY

Viewed from a first aspect, the present invention provides a method for performing attribute-based access control across a first and a second security domain in a federated processing environment, the method including: receiving, in the second security domain, a security token from a first service provider in the first security domain, where the security token includes access control attributes; receiving from an identity provider in the second security domain access control information associated with a request to process an online transaction in the second security domain; mapping the access control information into access control attributes compatible with a format of the access control attributes of the received security token; appending the mapped access control attributes into the received security token to create a modified security token; and signing, with a certificate of a second service provider in the second security domain, the modified security token and issuing the modified security token for consuming by any service provider in the second security domain.

Preferably, the present invention provides a method where consuming the modified security token includes validating the modified security token by verifying a signature and content of the modified security token using a certificate of an asserting party.

Preferably, the present invention provides a method where the asserting party one of a plurality of service providers in the second security domain that appended the mapped access control attributes into the received security token.

Preferably, the present invention provides a method where the asserting party includes one of a plurality of service providers in the second security domain that signed the modified security token.

Preferably, the present invention provides a method where validating the modified security token is further performed by using a private key of a public key cryptographic scheme.

Preferably, the present invention provides a method further including transmitting the modified security token by a secure network protocol to a third service provider in a third security domain.

Preferably, the present invention provides a method where receiving, in the second security domain, the security token from the first service provider in the first security domain includes receiving, in the second security domain, the security token from the first service provider in the first security domain via a secure network protocol.

Viewed from another aspect, the present invention provides an apparatus for performing attribute-based access control across a first and a second security domain in a federated distributed processing environment, the apparatus including: a receiving component for receiving, in the second security domain, a security token from a first service provider in the first security domain, where the security token includes access control attributes; a validator component for receiving from an identity provider in the second security domain access control information associated with a request to process an online transaction in the second security domain; a modifier component for mapping the access control information into access control attributes compatible with a format of the access control attributes of the received security token, appending the mapped access control attributes into the received security token to create a modified security token, and signing with a certificate of a second service provider in the second security domain the modified security token; and a re-issuing component for issuing the modified security token for consuming by any service provider in the second security domain.

Preferably, the present invention provides an apparatus further including a consumer component for consuming the modified security token and further including validating the modified security token by verifying a signature and content of the modified security token using a certificate of an asserting party.

Preferably, the present invention provides an apparatus where the asserting party includes one of a plurality of service providers in the second security domain that appended the mapped access control attributes into the received security token.

Preferably, the present invention provides an apparatus where the asserting party includes one of a plurality of service providers in the second security domain that signed the modified security token.

Preferably, the present invention provides an apparatus where validating the modified security token is further performed by using a private key of a public key cryptographic scheme.

Preferably, the present invention provides an apparatus further including a transmitting component for transmitting the modified security token by a secure network protocol to a third service provider in a third security domain.

Preferably, the present invention provides an apparatus where the receiving component further includes receiving, in the second security domain, the security token from the first service provider in the first security domain via a secure network protocol.

Viewed from another aspect, the present invention provides a computer program product including a computer readable storage medium having computer readable program code embodied therewith, where the computer readable storage medium is not a transitory signal per se and where the computer readable program code when executed on a computer causes the computer to perform all the steps of the method as described above.

Advantageously, the present invention provides for access based control attributes contained within an issued security token in a first security domain as well as the access based control attributes appended to the modified security token to be trusted by service providers in a second security domain. The access based control attributes are appended to the received security token. No previously added access based control attributes are overwritten. The service provider issuing the modified security token can assert that it has only appended access based control attributes and has not removed or modified any other data in the security token. Preferably, the security token is a SAML token.

A service provider in the second security domain can trust the modified security token if the service provider in the second security domain that is passing the modified security token can be trusted and if a new issuing service provider of the modified security token is also trusted. The issuing service provider or the passing service provider is trusted if a receiving service provider has a trusting relationship between them. A trusting relationship may be implemented by using an encrypted and authenticated network connection. The issuer is trusted if the token can be validated. The validation of the token comprises the verification of the issuer signature. Being able to verify the signature means to hold the public key of the signer and therefore to trust the signer.

Further the, identity provider that validated the original security token, created read-only containers, and verified the signature of the original issuers, trusts the new issuer as the new issuer holds the private key (used to re-sign the token). Hence, all conditions for trust are true if the original identity provider is trusted. Similarly, all the other service providers in the second security domain can trust the security token content if the processing service provider is trusted. Preferably, implementing a trusting relationship between two service providers in a security domain can be carried out by using an encrypted and authenticated connection, for example.

BRIEF DESCRIPTION OF THE SEVERAL VIEWS OF THE DRAWINGS

A preferred embodiment of the present invention will now be described by way of example only, with reference to the accompanying drawings in which.

DETAILED DESCRIPTION

Figure 1:
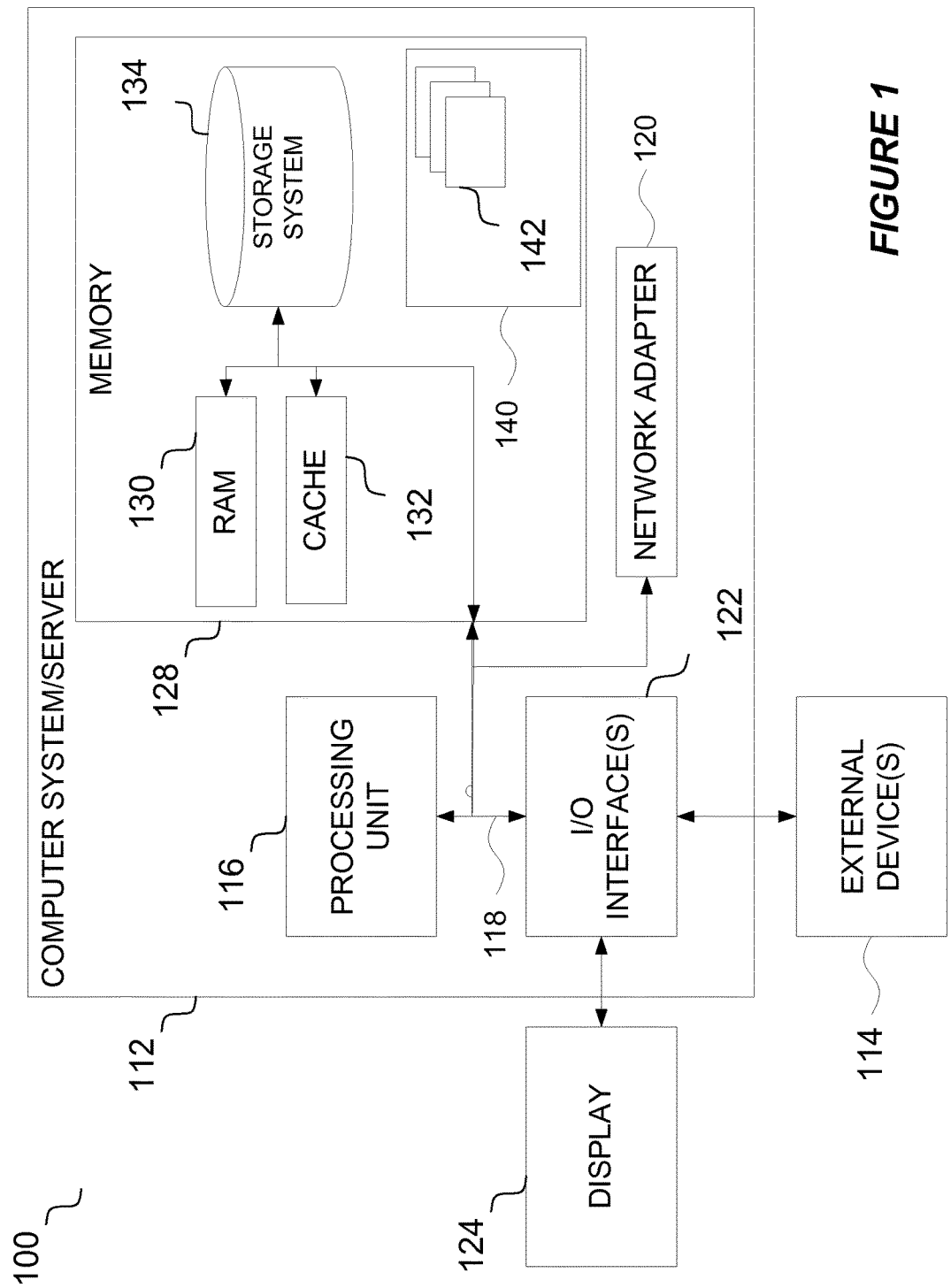
FIG. 1 is a block diagram depicting a cloud computing node.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

It should be noted that conception of the present subject matter resulted from recognition of certain limitations associated with online transaction systems. It was observed that often, when a user initiates a transaction, this transaction will require support from multiple service providers, such as, for example, selecting goods for purchase from a first website and then being directed to a second website in order to pay for the goods. These websites may span more than one network, and are often supported by different service providers and run on different computing platforms.

To make the above process appear seamless to a user, a single sign on (SSO) model is used. This enables a user to sign into a website using their credentials and the same credentials are then used for accessing protected resources that are required to complete the transaction on another computer platform, which may be run by another service provider.

To use a single sign on, a user first authenticates with an identity provider. Based on this authentication, and without having to sign in again, the user may access resources provided by one or more service providers. These one or more service providers are in, what is known as, a federated relationship. Federation refers to an establishment of business agreements, cryptographic trust, and user identifiers or attributes across security and policy domains to enable seamless cross-domain business transactions.

In order to exchange security information between an identity provider and a service provider an open standard data format may be used called Security Assertion Markup Language (SAML). SAML defines extensible markup language-based (XML-based) assertions and protocols, bindings, and profiles. SAML assertions are usually transferred from identity providers to service providers. SAML assertions contain statements that service providers use to make access control decisions. Three types of statements are provided by SAML: authentication statements, attribute statements, and authorization decision statements.

Authentication statements assert to a service provider that a user did authenticate with the identity provider at a particular time using a particular method of authentication. An attribute statement asserts that a subject (user) is associated with certain attributes. An attribute is a name-value pair. Relying parties, such as service providers, use attributes to make access-control decisions.

An authorization decision statement asserts that a subject (user) is permitted to perform an action on resource given evidence ("I am who I say I am"). An authorization assertion comprises proof that a certain user has been authorized to access a specified resource. Typically, such assertions are issued by an identity provider when a user operated client device requests access to a specified resource. The client device must present identity information to the identity provider that ensures that the client does have permission to access the resource. The identity provider then issues a SAML authorization assertion stating whether the client device is allowed to access the resource.

In view of these observations, it was determined that a problem occurs when service providers are located in different security domains. It was further determined that there is no known mechanism that provides for attribute based access control information contained within a SAML authorization assertion to be used between service providers located in different security domains. The technology described herein provides a solution to these problems.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via Input/Output (I/O) interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
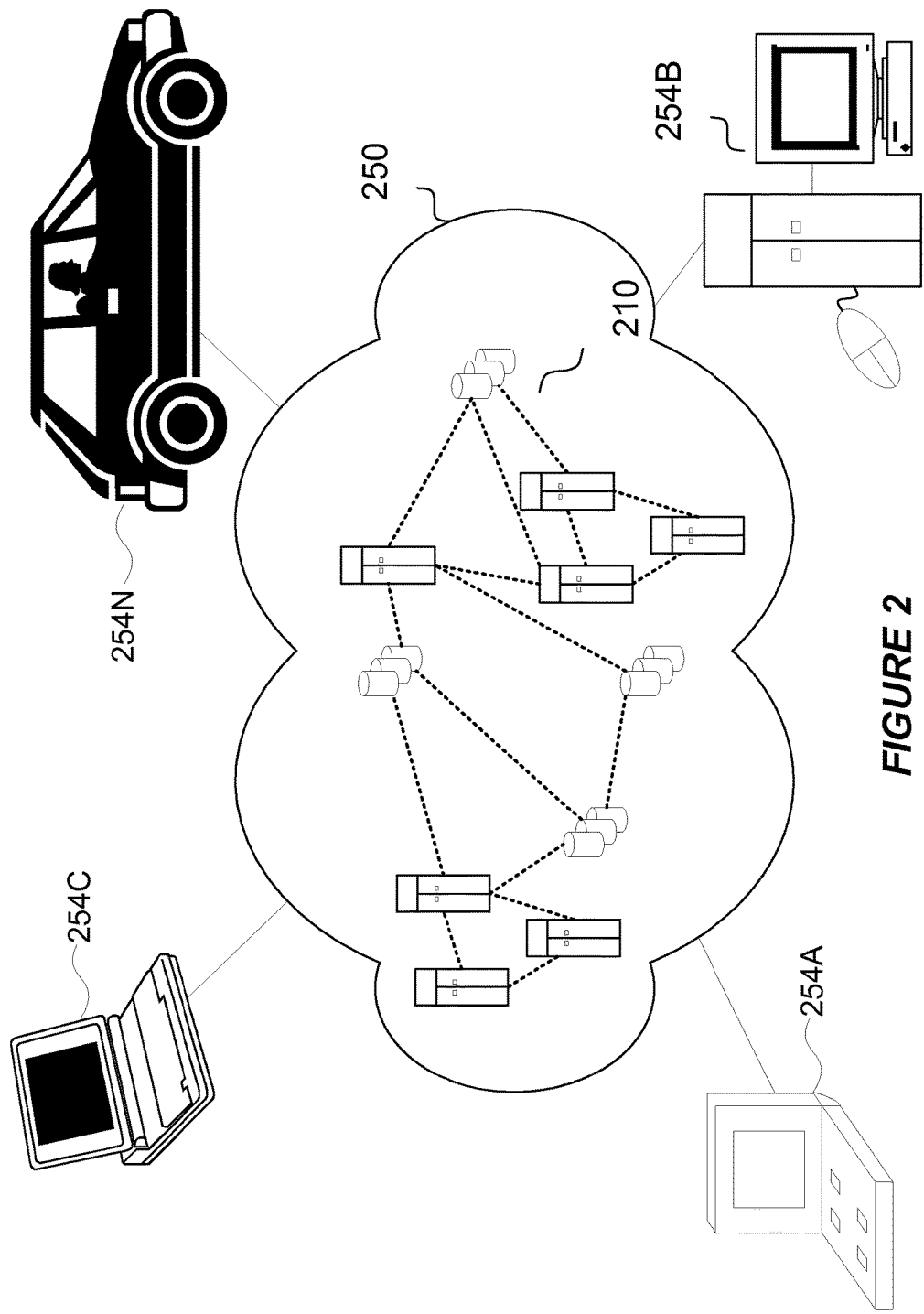
FIG. 2 is a block diagram depicting a cloud computing environment.

Referring now to FIG. 2, illustrative cloud computing environment 250 is depicted. As shown, cloud computing environment 250 comprises one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
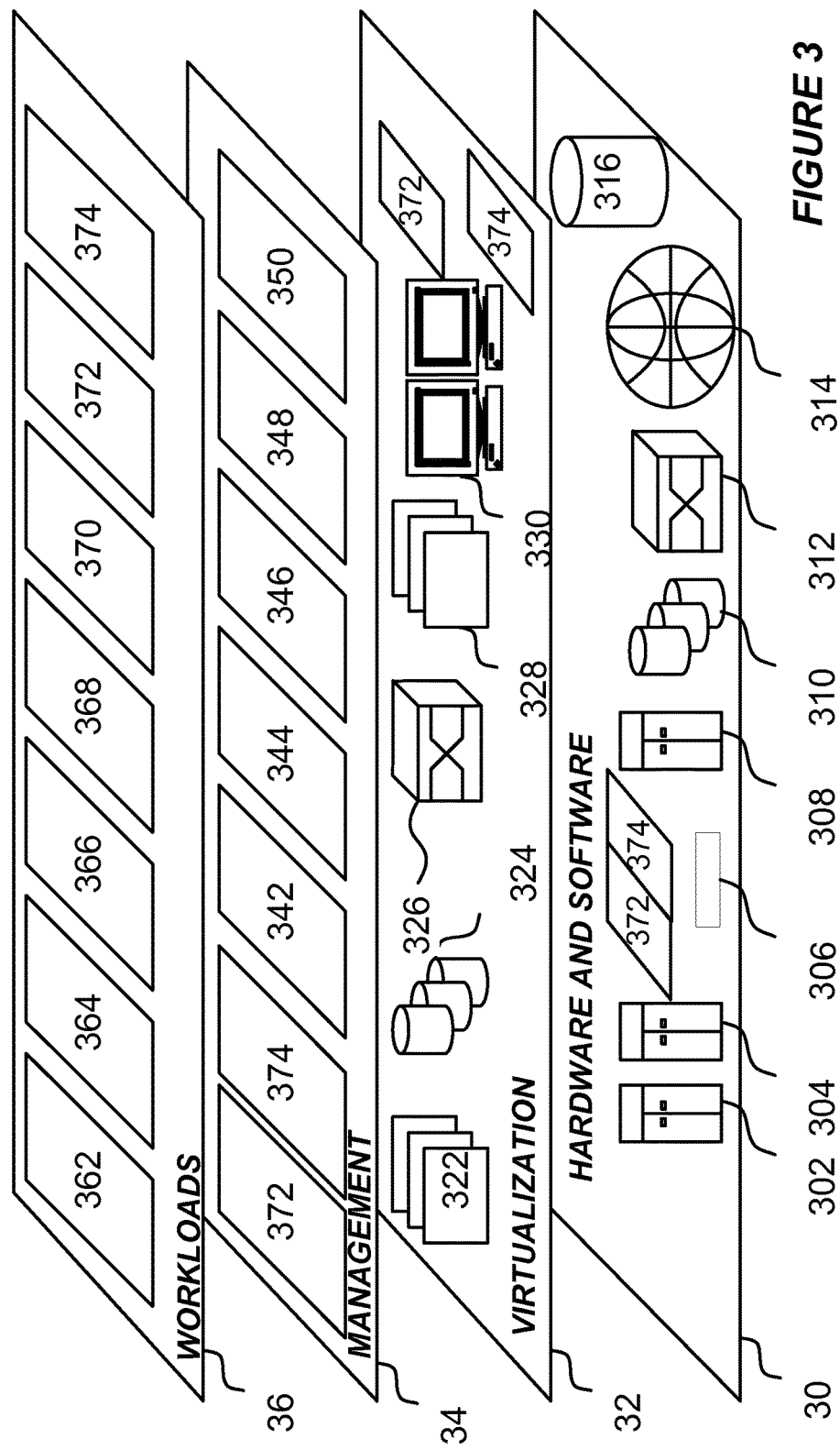
FIG. 3 is a block diagram depicting a set of functional layers provided the cloud computing environment of FIG. 2.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 30 includes hardware and software components. Examples of hardware components include mainframes 302, in one example IBM® zSeries® systems; RISC (Reduced Instruction Set Computer) architecture based servers 304, in one example IBM pSeries® systems; IBM xSeries® systems 306; IBM BladeCenter® systems 308; storage devices 310; networks and networking components 312. Examples of software components include network application server software 314, in one example IBM WebSphere® application server software; and database software, in one example IBM DB2® database software 316.

Virtualization layer 32 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 34 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 36 provides examples of functionality for which the cloud computing environment may be utilized.

Examples of workloads and functions which may be provided from this layer include: mapping and navigation 362; software development and lifecycle management 364; virtual classroom education delivery 366; data analytics processing 368; identity management 372 and online transaction processing 374. Identity management and online transaction processing can take place in any the layers depicted in FIG. 3.

Figure 4:
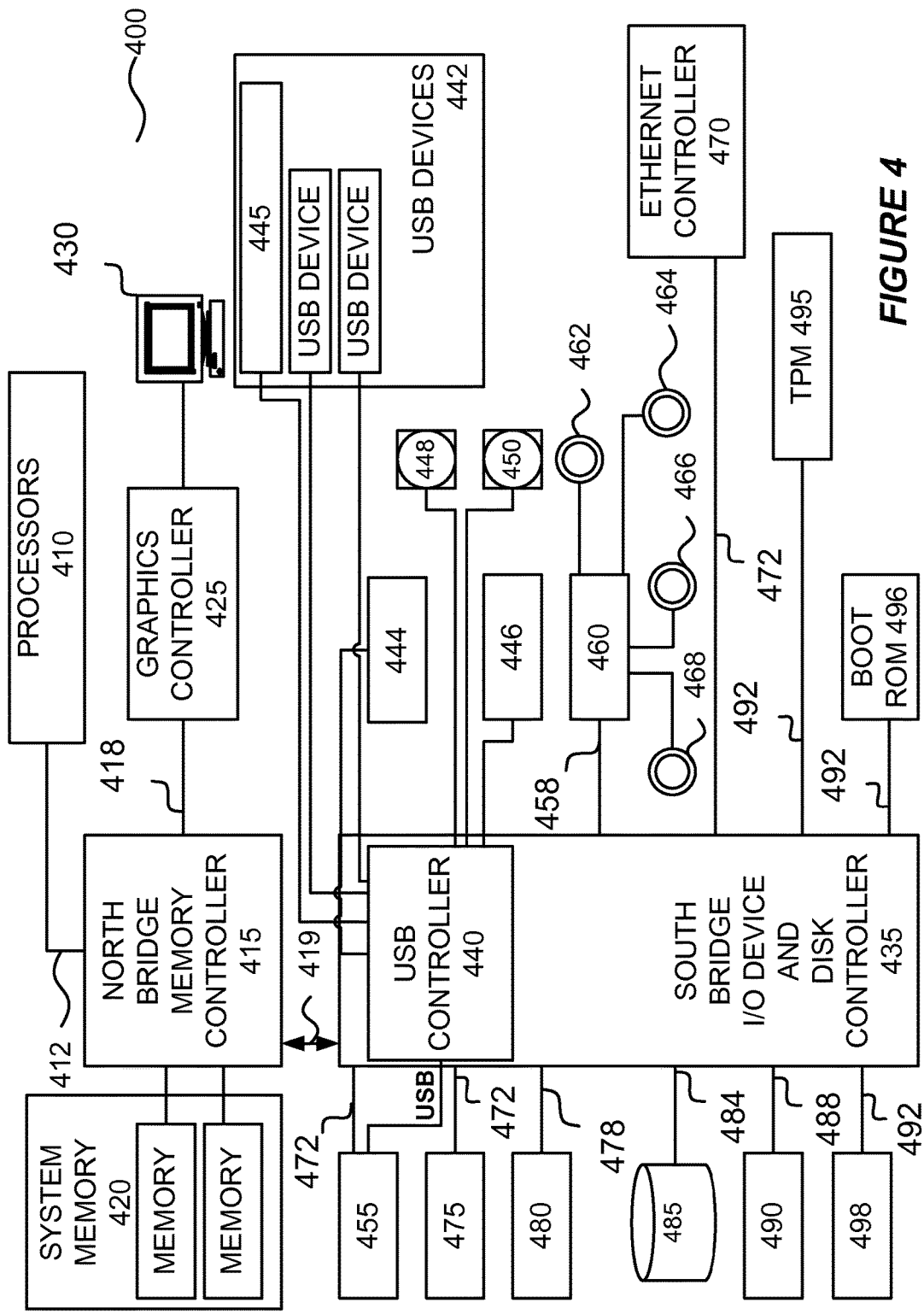
FIG. 4 is a block diagram depicting an information handling system.

FIG. 4 illustrates an information handling system 400, which is an example of a computer system capable of performing the computing operations described herein. Information handling system 400 includes one or more processors 410 coupled to processor interface bus 412. Processor interface bus 412 connects processors 410 to Northbridge 415, which is also known as the Memory Controller Hub (MCH). Northbridge 415 connects to system memory 420 and provides a means for processor(s) 410 to access the system memory 420. Graphics controller 425 also connects to Northbridge 415. In one embodiment, PCI Express bus 418 connects Northbridge 415 to graphics controller 425. Graphics controller 425 connects to display device 430, such as a computer monitor.

Northbridge 415 and Southbridge 435 connect to each other using bus 419. In one embodiment, the bus 419 is a Direct Media Interface (DMI) bus that transfers data at high speeds in each direction between Northbridge 415 and Southbridge 435. In another embodiment, a Peripheral Component Interconnect (PCI) bus connects the Northbridge 415 and the Southbridge 435. Southbridge 435, also known as the I/O Controller Hub (ICH), is a chip that generally implements capabilities that operate at slower speeds than the capabilities provided by the Northbridge 415. Southbridge 435 typically provides various busses used to connect various components. These busses include, for example, PCI and PCI Express busses, an ISA bus, a System Management Bus (SMBus or SMB), and/or a Low Pin Count (LPC) bus 492. The LPC bus often connects low-bandwidth devices, such as boot ROM 496 and "legacy" I/O devices 498 (using a "super I/O" chip). The "legacy" I/O devices 498 may include, for example, serial and parallel ports, keyboard, mouse, and/or a floppy disk controller. The LPC bus also connects Southbridge 435 to Trusted Platform Module (TPM) 495. Other components often included in Southbridge 435 include a Direct Memory Access (DMA) controller, a Programmable Interrupt Controller (PIC), and a storage device controller, which connects Southbridge 435 to nonvolatile storage device 485, such as a hard disk drive, using bus 484.

ExpressCard 455 is a slot that connects hot-pluggable devices to the information handling system. ExpressCard 455 supports both PCI Express and USB connectivity as it connects to Southbridge 435 using both the Universal Serial Bus (USB) the PCI Express bus 472. Southbridge 435 includes USB Controller 440 that provides USB connectivity to devices that connect to the USB. These devices include webcam (camera) 450, infrared (IR) receiver 448, keyboard and trackpad 444, and Bluetooth device 446, which provides for wireless personal area networks (PANs). USB Controller 440 also provides USB connectivity to other miscellaneous USB connected devices 442, such as a mouse, removable nonvolatile storage device 445, modems, network cards, ISDN connectors, fax, printers, USB hubs, and many other types of USB connected devices. While removable nonvolatile storage device 445 is shown as a USB-connected device, removable nonvolatile storage device 445 could be connected using a different interface, such as a Firewire interface, etc.

Wireless Local Area Network (LAN) device 475 connects to Southbridge 435 via the PCI or PCI Express bus 472. LAN device 475 typically implements one of the IEEE 0.802.11 standards of over-the-air modulation techniques that all use the same protocol to wirelessly communicate between information handling system 400 and another computer system or device. Optical storage device 490 connects to Southbridge 435 using Serial ATA (SATA) bus 488. Serial ATA adapters and devices communicate over a high-speed serial link. The Serial ATA bus also connects Southbridge 435 to other forms of storage devices, such as hard disk drives. Audio circuitry 460, such as a sound card, connects to Southbridge 435 via bus 458. Audio circuitry 460 also provides functionality such as audio line-in and optical digital audio in port 462, optical digital output and headphone jack 464, internal speakers 466, and internal microphone 468. Ethernet controller 470 connects to Southbridge 435 using a bus, such as the PCI or the PCI Express bus 472 (shown again). Ethernet controller 470 connects information handling system 400 to a computer network, such as a Local Area Network (LAN), the Internet, and other public and private computer networks.

While FIG. 4 shows one information handling system 400, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, automated teller machine (ATM), a portable telephone device, a communication device or other devices that include a processor and memory.

Figure 5:
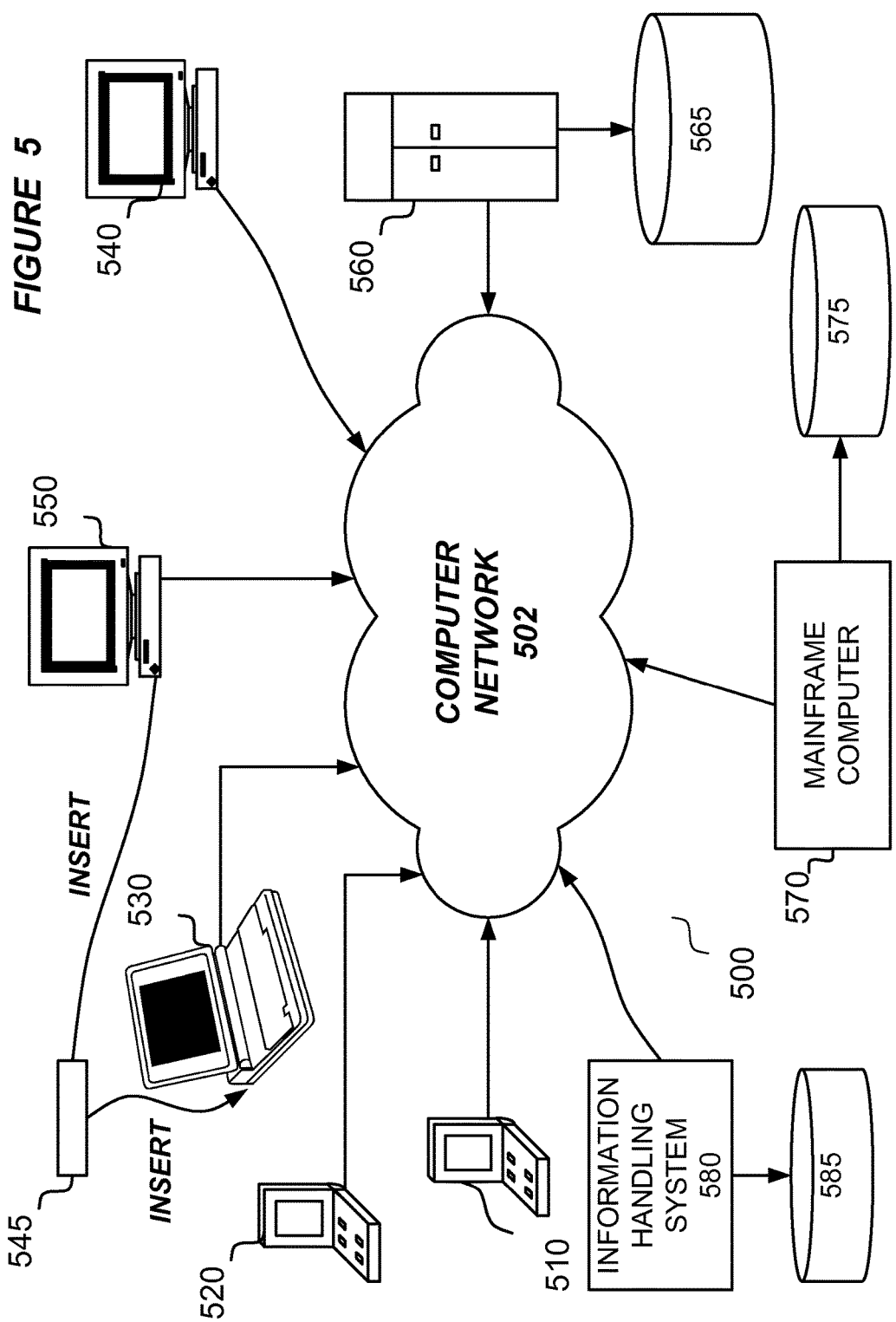
FIG. 5 is a block diagram depicting an extension of the information handling system of FIG. 4, in which a preferred embodiment of the present invention may be implemented.

FIG. 5 provides an extension of the information handling system 400 environment shown in FIG. 4 to illustrate that the methods described herein may be performed on a wide variety of information handling systems 400 that operate in a networked environment 500. Types of information handling systems 400 range from small handheld devices, such as handheld computer/mobile telephone 510 to large mainframe systems, such as mainframe computer 570. Examples of handheld computer 510 include personal digital assistants (PDAs), personal entertainment devices, such as MP3 players, portable televisions, and compact disc players. Other examples of information handling systems include pen, or tablet, computer 520, laptop, or notebook, computer 530, workstation 540, personal computer system 550, and server 560. Other types of information handling systems that are not individually shown in FIG. 5 are represented by information handling system 580. As shown, the various information handling systems may be networked together using computer network 502. Types of computer networks that may be used to interconnect the various information handling systems include Local Area Networks (LANs), Wireless Local Area Networks (WLANs), the Internet, the Public Switched Telephone Network (PSTN), other wireless networks, and any other network topology that may be used to interconnect the information handling systems. Many of the information handling systems include nonvolatile data stores, such as hard drives and/or nonvolatile memory. Some of the information handling systems shown in FIG. 5 depict separate nonvolatile data stores (server 560 utilizes nonvolatile data store 565, mainframe computer 570 utilizes nonvolatile data store 575, and information handling system 580 utilizes nonvolatile data store 585). The nonvolatile data stores may be components that are external to the various information handling systems or may be internal to one of the information handling systems. In addition, removable nonvolatile storage device 545 may be shared among two or more information handling systems using various techniques, such as connecting the removable nonvolatile storage device 545 to a USB port or other connector of the information handling systems.

The networked environment 500 may also include one or more service providers 590, 590*a* (not separately illustrated) operating one or more mainframe computers 570 or servers 560 and one or more identity providers 595, 595*a* (not separately illustrated) operating on one or more mainframe computers 570 or servers 560.

A service provider 590, 590*a* provides one or more online services to one or more users operating an information handling device 520, 530, 550. Each of the mainframe computers 570 and/or servers 560 may be located within the same geographical area or may be geographically dispersed. Each of the mainframe computers 570 and/or servers 560 may operate within the same network or operate in a different network, such as, a network owned and/or operated by a different service provider. Each server 560 or mainframe computers 570 may run one or more applications for providing online services and for processing online transactions. Each server 560 or mainframe computer 570 may interact with one or more directory services 575, 565. To complete a user's online transaction request, an online transaction may utilize one or more applications under the control of one or more service providers 590, 590*a* to process the user's transaction request. For example, a flight booking service may be under the control of a first service provider 590 and a hotel booking service may be provided by a second service provider 590*a*.

A user is an entity that initiates an online transaction. The user may be any user that operates an information handling device 520, 530, 550 etc. Typically, the information handling device 520, 530, 550 is running a web browser or some other user agent that is operable for requesting and receiving resources from service providers 590, 590*a*.

Users typically initiate requests to service providers 590, 590*a* by using an HTTP request or other form of a request/response protocol to the service provider 590, 590*a*. A user may access resources controlled by a service provider 590, 590*a* using web single sign on (SSO). SSO allows a user to authenticate to a website and, without additional authentication, access personalized or customized resources located at another website controlled by the same or another service provider.

Figure 6:
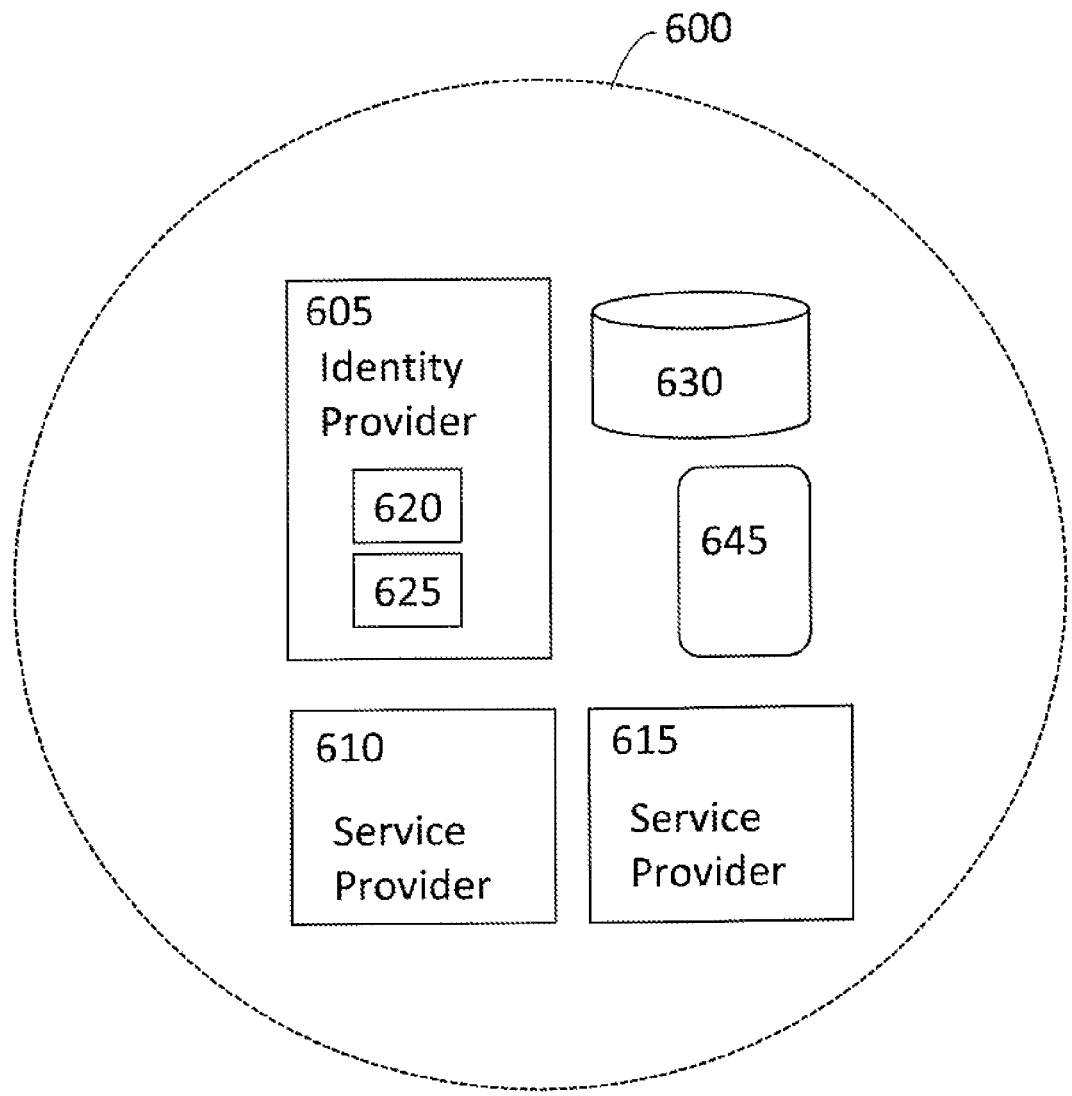
FIG. 6 is a block diagram depicting a federated information handling system in which a preferred embodiment of the present invention may be implemented.

Referring to FIG. 6, one or more service providers 610, 615 are grouped into a federated security domain 600. The security domain 600 is a federated grouping of service providers 610, 615 for providing a collaborative application environment for processing online transaction requests. The service providers 610, 615 establish a common shared name identifier to refer to the user in order to share the information about the user throughout the security domain 600. In this context, a user is said to have a federated identity between a set of service providers 610, 615.

In this federated security domain 600, an identity provider 605 is responsible for issuing identification information for all the service providers 610, 615 in its security domain. In one embodiment this is achieved by the use of security tokens. In a preferred embodiment, a security token is a software token for carrying out authentication and/or authorization. In a preferred embodiment, the authentication mechanism is implemented by either a shared secret architecture or public-key cryptography architecture. However, a person skilled in the art will realize that other authentication mechanisms may be used without departing from the scope of the invention.

The identity provider 605 operates in its own secure environment in order to maintain an appropriate level of security, for example, operating in its own memory address space. In another embodiment, although the service provider's servers and identity provider server may be located in the same physical rack, they may in fact be running on dedicated server hardware. The identity provider 605 issues a security token. A security token may be any means by which a user may be authenticated or authorized to access resources. A security token states that the information contained within the token is true and that the identity provider is trusted because the security token is signed, by the identity provider, using some form of a signing mechanism, such as a certificate. In an embodiment, SAML may be used as the means for transferring security information. SAML defines XML-based assertions and protocols, bindings, and profiles.

The identity provider 605 includes many software programs 620, 625 for cooperating with each other to provide identity management services. In particular, the identity provider 605 includes software programs for issuing security tokens that include authentication and authorization data for consuming by service providers 610, 615. To issue security tokens, the identity provider 615 may interact with a directory service 645 for accessing directory records 630 of users.

Figure 7:
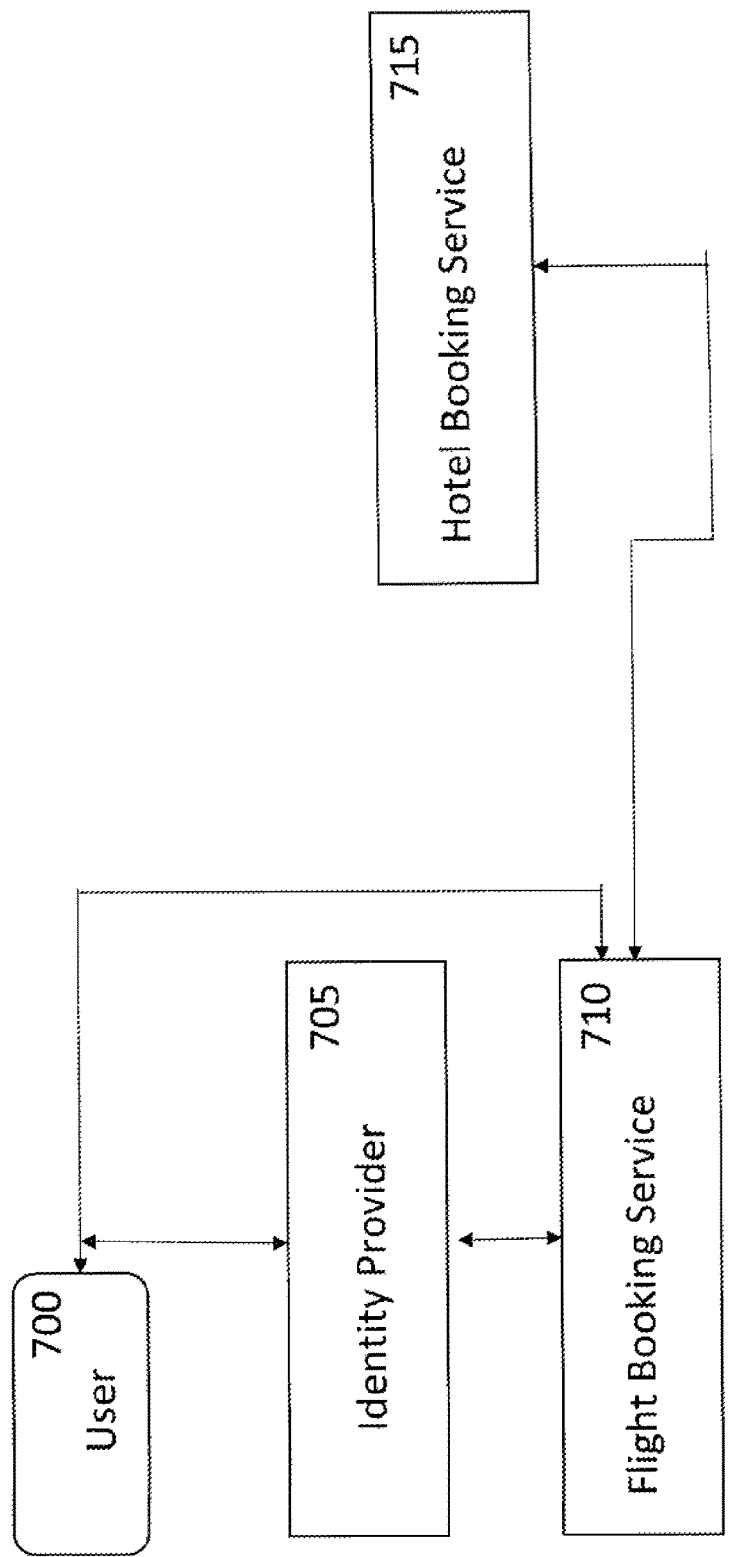
FIG. 7 is a block diagram illustrating the process flow between identity providers and service providers in the federated information handling system, as improved by a preferred embodiment of the invention.

FIG. 7 illustrates a data flow of a user's transaction request. In this example, all service providers 610, 615 are operating in a federated grouping in a single security domain 600. A user operating an information handling device accesses a website, for example, <<flightbookingservice.com>>, run by a first service provider 610, and decides to book a flight at step 700. The user logs into the website with their security credentials, typically, their user name and password. The identity provider 605 handles the authentication and authorization at step 705. Once the user has been authorized, through attribute-based access control, and authenticated, the user may access resources provided by the service provider 610, for example, <<flightbookingservice.com>>, at step 710. At some point in the browsing process the user is directed to a different service provider's website for example, <<hotelbookingservice.com>>, run by a second service provider 615, at step 715, to hire a car. It is assumed that a federated identity for the user has been previously established between <<flightbookingerservice.com>> and <<hotelbookingservice.com>> because of a business agreement previously established between the two service providers 610, 615. The service provider 610 site (<<flightbookingservice.com>>) asserts to the service provider 615 site (<<.hotelbookingservice.com>>) that the user is known, by referring to the user by the user's federated identity, that the user has authenticated, and that the user has certain identity attributes (e.g., has a gold membership). Since <<hotelbookingservice.com>> trusts <<flightbookingservice.com>>, it trusts that the user is valid and properly authenticated and thus creates a local session for the user. Because of this trust relationship (in the federated environment) the user does not have to re-authenticate when the user is directed to <<hotelbookingservice.com>> at step 715. The above example all takes place in the same security domain 600.

It was recognized that a problem occurs when there is a need to access a service provided by a service provider located in a different security domain. This is because the identity service provider 610 of the first security domain 600 has a structured set of attribute-based access control information (attributes) valid for its security domain 600, but this same set of access control data may not be valid for an identity provider of a second security domain. Hence, each of the service providers in the second security domain are unable to authorize a user with attribute data that is only valid in the first security domain and vice versa. Because, the attributes are only valid in a particular security domain, this results in the user having to re-authenticate when the user's transaction request is required to be processed by another service provider in another security domain.

To solve this recognized problem, in a preferred embodiment, to exchange authorization and authentication data between each of the service providers the Security Assertion Markup Language (SAML) is used. SAML is the standard data format for exchanging the authentication and authorization data. However, a person skilled in the art will realize that other security exchange mechanisms may be used.

The SAML specification defines three roles: a user, an identity provider, and a service provider. Typically, the user requests a service from the service provider. The service provider requests and obtains a SAML token from the identity provider. A SAML token is a document written in XML for exchanging authentication and authorization data about a user between service providers. On the basis of this SAML assertion, the service provider may make a decision, such as to grant or deny access to resources.

The present invention focuses on the use of authorization attributes contained within a security token. One such security token is a SAML security token. A SAML token comprises a SAML assertion. The SAML assertion includes statements in XML concerning authentication and authorization data associated with a user.

A security token is issued by an identity provider associated with a particular security domain. Any of the service providers located in the security domain may use the security token to authorize the user. The security token is signed by a signing authority, typically, an identity provider. The security token is issued and signed by the identity provider when the user initiates a transaction.

Figure 8:
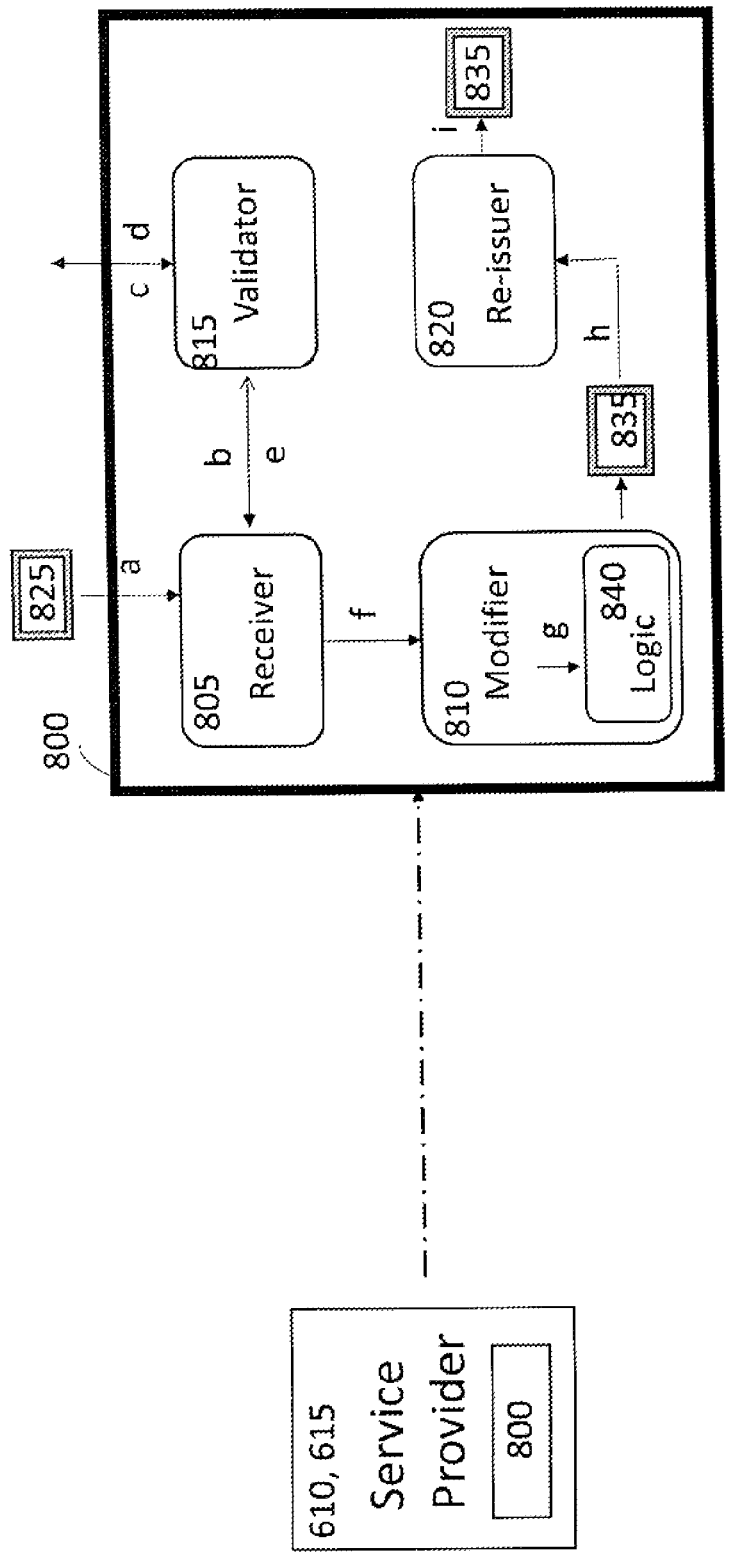
FIG. 8 is a block diagram illustrating a modified processing module of a service provider of FIG. 7 in accordance with a preferred embodiment of the invention.
Figure 9:
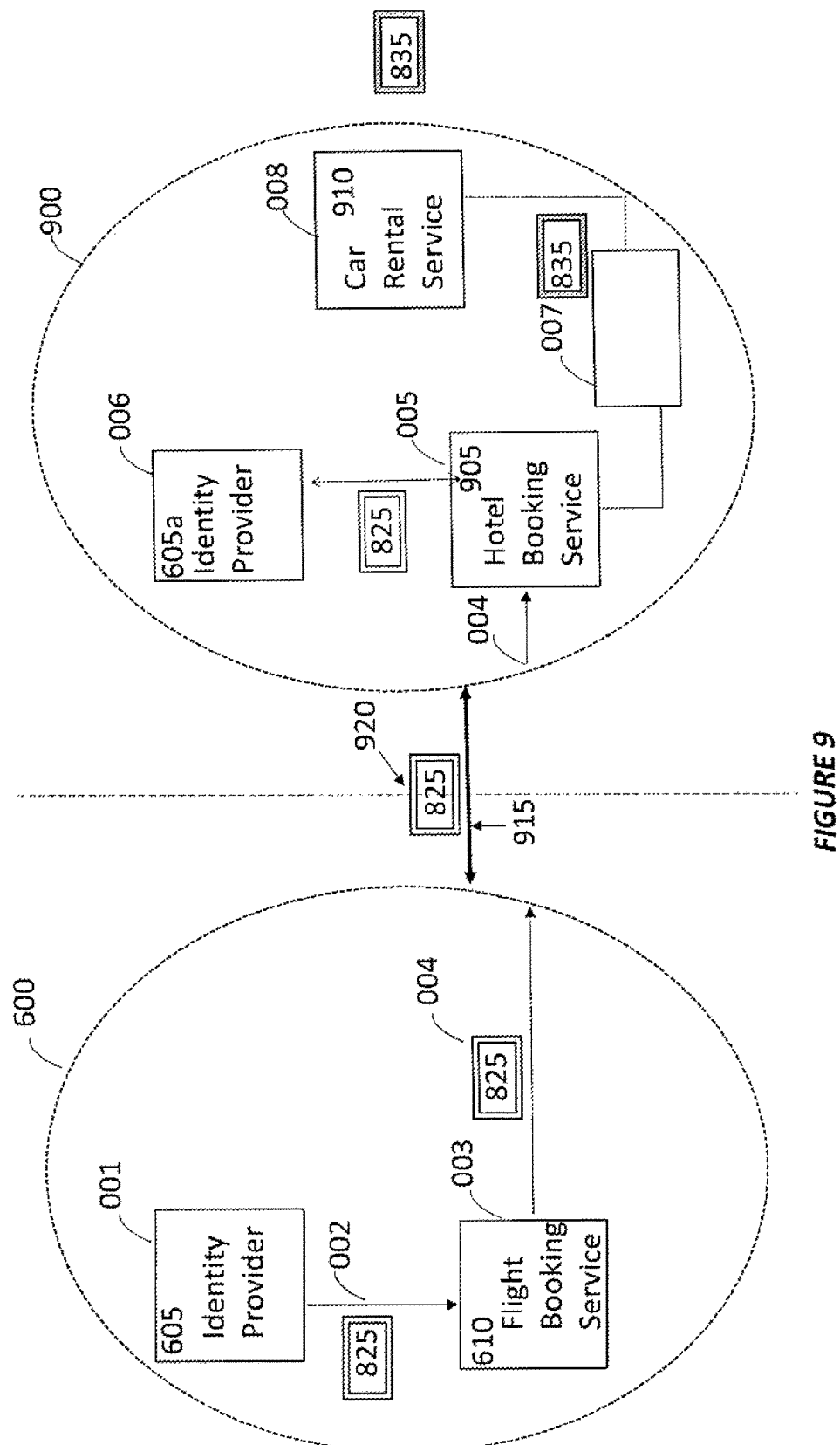
FIG. 9 is a block diagram illustrating the process flow between service providers in different security domains in accordance with a preferred embodiment of the invention.

In accordance with a preferred embodiment of the present invention, and with reference to FIG. 8 and FIG. 9, service provider 610, 615 include a modified processing module 800. The modified processing module 800 includes a receiver component 805 for receiving a security token 825 from an identity provider 605 and for consuming a modified security token from other service providers, a validator module 815 for validating the received security token 825, a modifier module 810 including a logic component 840 for appending attributes to the security token 825 and for re-signing the security token to create a modified security token 835, a re-issuer component 820 for issuing the modified security token 835 to another service provider in a transaction processing chain. Each of the components co-operates and interacts with each other to provide the benefits of the present invention.

In a preferred embodiment, each service provider 610, 615 include a modified processing module 800 for processing a security token 825. However, in an alternative embodiment, a single service provider in a security domain 600 may be designated as a processing service provider and all service providers may route the security token 825 to the processing service provider for further processing and modification as described above.

In FIG. 9, reference numerals 001 to 008 depict data flow steps of an identity provider and service providers when processing a transaction in at least two security domains in accordance with a preferred embodiment of the present invention.

A user logs onto a website in a first security domain 600 and an identity provider issues a security token 825 (step 001) for transmitting to a service provider 610 (step 002) for authorizing the user (step 003).

When a user's request is to be processed by a service provider 905, 910 in a different security domain 900, the security token 825 is sent to a service provider 905, who is the next service provider in a transaction chain to process the user's transaction (step 004). For example, the service provider 905 may be a hotel booking service as shown in FIG. 9. The receiver component 805 of the modified processing module 800 of the service provider 905 receives the security token 825 (step a of FIG. 8), and sends a call to the validator component 815 for the validator component 815 to validate the contents and the sender of the security token 825 (step b of FIG. 8, step 005 of FIG. 9). The validator component 815 in one embodiment uses public key cryptography for signature verification for example. However, a person skilled in the art will realize that other forms of signature verification may be used without departing from the scope of the invention. An advantage of the validation process is that the signature proves the identity and then the trustworthiness of the identity provider.

Once validated, the validator component 815 sends a request to the identity provider 605a (step 006) of its security domain 900 and requests the access control data associated with the user (step c of FIG. 8). Preferably, the access control data is stored in a directory service in the security domain 900. The directory service may store the access control information (e.g., the user permissions) in the form of attributes. The service provider 905, 910 receive the attributes in a form depending on the protocol deployed (step d of FIG. 8).

At step e of FIG. 8, the receiver 805 receives the attributes (step e of FIG. 8) and the modifier component 810 transforms the access control attributes (step f of FIG. 8) received from the identity provider 605a into a format that is compatible with the attribute data contained within the security token 825. This is achieved using logic stored in the logic component 840 (step g of FIG. 8). An example of the different data types is shown in Table 1 below:

TABLE 1

| SAML assertion attributes<br>Name<br>Friendly Name | Access control data<br>memberOf |
|---|---|
| Value 1 | Group 1 |
| Value 2 | Group 2 |

As is shown above, the format of the access control data contained within the directory service and the access-based control attributes of the security token 825 may be in different formats. For example, from the directory service, the attributes may be received in the form of "name," "value" pairs (e.g., "credit card," "golden,"). The attributes may be made up of, for example, three different attribute types "name," "friendly name," and "value" (e.g., Value 1 and Value 2). Based on logic of the logic component 840, the modifier component 810 maps the name value pairs received from the directory service into the name value pairs of the expected attributes of the security token. Once mapping is complete, the mapping is transformed into XML.

Before appending the transformed attributes (mapped "name," "value" pairs, and XML) into the received security token 825, the digital signature of the issuing identity provider 605 is removed from the security token 825. The modifier component 810 updates the security token 825 with the identifier of the new issuer 905 of the security token 825. The identifier of the new issuer (e.g., the service provider that is issuing the modified security token 835 for consuming by one or more other service providers) may be a digital signature or some other artifact that is unique to the new issuer. The modifier component 810 proceeds to sign the security token 825 with, for example, a certificate. In this example, the service provider 905 is re-signing the security token 825. Because the security token has been re-signed, the service provider 905 becomes the asserting party. The service provider 905 asserts that it has only added information to the original security token provided by the identify provider 605*a*.

The modifier component 810 only inserts the transformed attributes and does not overwrite or remove any other information written in the now modified security token 835.

The modifier component sends the modified security token 835 to a re-issuer component 820 (step h of FIG. 8) for sending to the next service provider (step 007) in the transaction chain (step i of FIG. 8). The next service provider may be a service provider in the second security domain or a service provider in a third security domain.

The service provider 910 that is designated 'next' in the transaction chain to process the user's transaction request consumes the modified security token 835 (step 008). If this next service provider 910 is operating within the same security domain 900, this service provider 910 may use the appended attributes contained within the modified security token 835 to authorize the user to access the services (e.g., in this example authorize the user to rent a car). If the next service provider 910 is operating within a different security domain to any of the other processing service providers, the process depicted by steps 004 to 008 commence to again modify the security token for the different security domain.

Preferably, all service providers 610, 905, 910, via a secure protocol 915, transmit a received security token and the attributes to either a designated SAML processing service provider for processing or another service provider in the transaction chain. Preferably, the modified security token is packaged into a writable data object for transmitting to another service provider. The modified security token may be transmitted over a secure protocol between a first service provider and a second service provider in the same security network. The modified security token may be transmitted over a secure communication channel between a first service provider and a second service provider in a different security network.

An example of an online transaction processing system is the IBM® Customer Information Control System (CICS®).

In a CICS® online transaction processing system, the functions of the system are broken down into applications. Each application may provide a different transactional function and have different responsibilities within the transaction, for example, providing security or providing auditability.

Applications may run in different geographical locations and/or run on different types of hardware. Applications may be grouped into business logic applications and presentation logic applications. Business logic applications are responsible for business calculations and updating databases. The presentation logic applications and their application interfaces control the presentation of information to end users. Presentation logic may be designed to run on a web browser of a client device.

A CICS® region is a named collection of resources (such as a transaction server, for example) controlled by CICS® as a unit. A CICS® resource is any facility or component of a CICS® system that is required to perform a task. The resources in a region include programs such as, Basic Mapping Support (BM) map sets, transactions, terminals, files, transient data queues, temporary storage queues, and journals.

Figure 10:
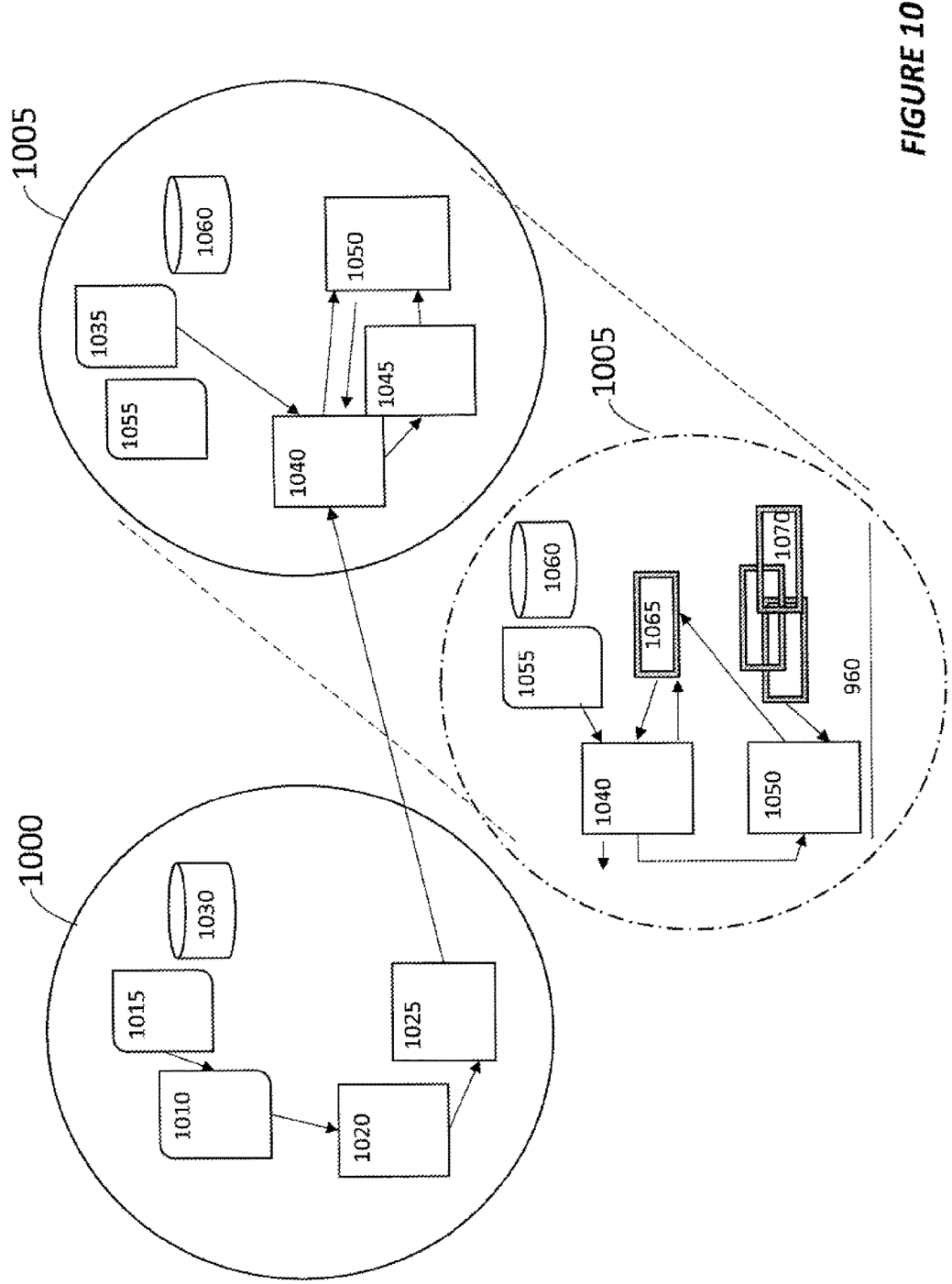
FIG. 10 is a block diagram illustrating the process flow between components in an online transaction processing system in accordance with a preferred embodiment of the present invention.

With reference to FIG. 10, each service provider 1020, 1025 runs transaction processing software such as IBM® CICS®. Service providers 1020, 1025 are grouped in regions and a region may be designated as a SAML owning region 1020. A SAML owning region 1020 is a transaction server or one or more resources dedicated to processing SAML information. Each region 1020, 1025 includes an identity provider 1010 that interfaces with one or more directory services 1015, 1030. One or more regions are assigned to a security domain 1000, 1005.

A SAML token is issued by an identity provider in security domain 1000. A CICS® region 1020 in security domain 1000 consumes the SAML token and extracts the SAML attributes contained within a SAML assertion to perform attribute-based authorization.

The SAML token is sent to a receiving region 1040 in the security domain 1005. The receiving region 1040 in security domain 1005 maps the subject of SAML token to a local user and retrieves access control information for the subject of the SAML token from a local security server 1055. The region 1040 maps access control information into SAML token and transforms the mapping into XML. The region 1040 sends the original SAML token and the transformed attributes to a SAML owning region 1050 through an interface based on channel/container data exchange 960. Preferably, the channel is a secure link using a secure protocol. The region 1050 appends attribute information and the original SAML token into writable containers 1070.

As additional aspects of the SAML token modification, the SAML owning region 1050, the region dedicated to SAML processing, reads the SAML information from the containers and validates the original SAML token 1070, strips the signature if the original SAML token 1070 was signed, adds the transformed attributes retrieved from the containers 1070 to the SAML token, updates the issuer 1050 of the SAML token 1070, re-signs the SAML token 1070, and places the modified SAML token into a read only container 1065.

The re-signing process may be configured by selecting an appropriate certificate that represents the new issuer of the SAML token and, for example, a certificate or a hash algorithm. Either the identity provider 1055 or one or more regions 1040, 1050 may issue the modified SAML token 1070 (modified from the original), depending on the implementation chosen both are modifiable.

A person skilled in the art will realize that although FIG. 10 has been explained with reference to the CICS® online transaction processing system, the embodiments are applicable to other online transaction processing systems.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

IBM® and CICS® are registered trademarks of International Business Machines Corporation registered in many jurisdictions worldwide.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for performing attribute-based access control across a first and a second security domain in a federated processing environment, the method comprising:
   receiving, in the second security domain, a security token from a first service provider in the first security domain, where the security token comprises access control attributes and a signature of an identity provider in the first security domain,
   receiving, from an identity provider in the second security domain access control information associated with a request to process an online transaction in the second security domain;
   mapping the access control information into additional access control attributes compatible with a format of the access control attributes of the received security token;
   appending the mapped additional access control attributes into the received security token;

re-signing, with a private key associated with a certificate of a second service provider in the second security domain, the received security token appended with the mapped additional access control attributes; and issuing the re-signed received security token for consuming, using the appended mapped additional access control attributes, by any service provider in the second security domain.

2. The method of claim 1, where consuming, using the appended mapped additional access control attributes, the re-signed received security token comprises validating the re-signed received security token by verifying a re-signed signature of the second service provider and content of the re-signed received security token using a public key of the certificate of the second service provider.

3. The method of claim 1, further comprising transmitting the re-signed received security token appended with the mapped additional access control attributes by a secure network protocol to a third service provider in a third security domain.

4. The method of claim 1, where receiving, in the second security domain, the security token from the first service provider in the first security domain comprises receiving, in the second security domain, the security token from the first service provider in the first security domain via a secure network protocol.

5. The method of claim 1, where the security token is a security assertion markup language (SAML) token.

6. An apparatus for performing attribute-based access control across a first and a second security domain in a federated processing environment, the apparatus comprising:
a memory; and
at least one processor programmed to:
receive, in the second security domain, a security token from a first service provider in the first security domain, where the security token comprises access control attributes and a signature of an identity provider in the first security domain;
receive, from an identity provider in the second security domain, access control information associated with a request to process an online transaction in the second security domain;
map, within the memory, the access control information into additional access control attributes compatible with a format of the access control attributes of the received security token;
append the mapped additional access control attributes into the received security token;
re-sign, with a private key associated with a certificate of a second service provider in the second security domain the received security token appended with the mapped additional access control attributes; and
issue the re-signed received security token for consuming, using the appended mapped additional access control attributes, by any service provider in the second security domain.

7. The apparatus of claim 6, where consuming, using the appended mapped additional access control attributes, the re-signed received security token comprises the at least one processor validating the re-signed received security token by verifying a re-signed signature of the second service provider and content of the re-signed received security token using a public key of the certificate of the second service provider.

8. The apparatus of claim 6, where the at least one processor is further programmed to transmit the re-signed received security token appended with the mapped additional access control attributes by a secure network protocol to a third service provider in a third security domain.

9. The apparatus of claim 6, where, in being programmed to receive, in the second security domain, the security token from the first service provider in the first security domain, the at least one processor is programmed to receive, in the second security domain, the security token from the first service provider in the first security domain via a secure network protocol.

10. The apparatus of claim 6, where the security token is a security assertion markup language (SAML) token.

11. A computer program product, comprising:
a computer readable storage medium having computer readable program code embodied therewith, where the computer readable storage medium is not a transitory signal per se and where the computer readable program code when executed on a computer causes the computer to, as part of performing attribute-based access control across a first and a second security domain in a federated processing environment:
receive, in the second security domain, a security token from a first service provider in the first security domain, where the security token comprises access control attributes and a signature of an identity provider in the first security domain;
receive from an identity provider in the second security domain access control information associated with a request to process an online transaction in the second security domain;
map the access control information into additional access control attributes compatible with a format of the access control attributes of the received security token;
append the mapped additional access control attributes into the received security token;
re-sign, with a private key associated with a certificate of a second service provider in the second security domain, the received security token appended with the mapped additional access control attributes; and
issue the re-signed received security token for consuming, using the appended mapped additional access control attributes, by any service provider in the second security domain.

12. The computer program product of claim 11, where consuming, using the appended mapped additional access control attributes, the re-signed received security token comprises validating the re-signed received security token by verifying a re-signed signature of the second service provider and content of the re-signed received security token using a public key of the certificate of the second service provider.

13. The computer program product of claim 11, where the computer readable program code when executed on the computer further causes the computer to transmit the re-signed received security token appended with the mapped additional access control attributes by a secure network protocol to a third service provider in a third security domain.

14. The computer program product of claim 11, where, in causing the computer to receive, in the second security domain, the security token from the first service provider in the first security domain, the computer readable program code when executed on the computer causes the computer to receive, in the second security domain, the security token from the first service provider in the first security domain via a secure network protocol.

15. The computer program product of claim 11, where the security token is a security assertion markup language (SAML) token.

16. The method of claim 1, where, by the re-signing of the received security token appended with the mapped additional access control attributes, the second service provider becomes an asserting party in the second security domain and asserts to all service providers in the second security domain that it has added the access control information provided by the identity provider in the second security domain to the received security token.

17. The method of claim 1, where the online transaction in the second security domain comprises at least a second transaction of a transaction processing chain that involves multiple distinct websites across multiple security domains, and where the second service provider in the second security domain comprises a next transaction website in the transaction processing chain after a website transaction involving a website hosted by the first service provider in the first security domain.

18. The method of claim 1, further comprising:
remove the signature of the identity provider in the first security domain from the received security token; and
updating the received security token with an identifier of the second service provider in the second security domain, where the second service provider in the second security domain becomes a new issuer of the received security token in the second security domain.

19. The apparatus of claim 6, where, by the re-signing of the received security token appended with the mapped additional access control attributes, the second service provider becomes an asserting party in the second security domain and asserts to all service providers in the second security domain that it has added the access control information provided by the identity provider in the second security domain to the received security token.

20. The apparatus of claim 6, where the online transaction in the second security domain comprises at least a second transaction of a transaction processing chain that involves multiple distinct websites across multiple security domains, and where the second service provider in the second security domain comprises a next transaction website in the transaction processing chain after a website transaction involving a website hosted by the first service provider in the first security domain.

21. The apparatus of claim 6, where the at least one processor is further programmed to:
remove the signature of the identity provider in the first security domain from the received security token; and
update the received security token with an identifier of the second service provider in the second security domain, where the second service provider in the second security domain becomes a new issuer of the received security token in the second security domain.

22. The computer program product of claim 11, where, by the re-signing of the received security token appended with the mapped additional access control attributes, the second service provider becomes an asserting party in the second security domain and asserts to all service providers in the second security domain that it has added the access control information provided by the identity provider in the second security domain to the received security token.

23. The computer program product of claim 11, where the online transaction in the second security domain comprises at least a second transaction of a transaction processing chain that involves multiple distinct websites across multiple security domains, and where the second service provider in the second security domain comprises a next transaction website in the transaction processing chain after a website transaction involving a website hosted by the first service provider in the first security domain.

24. The computer program product of claim 11, where the computer readable program code when executed on the computer further causes the computer to:
remove the signature of the identity provider in the first security domain from the received security token; and
update the received security token with an identifier of the second service provider in the second security domain, where the second service provider in the second security domain becomes a new issuer of the received security token in the second security domain.

* * * * *